United States Patent
Kelley

(10) Patent No.: US 8,448,498 B1
(45) Date of Patent: May 28, 2013

(54) HERMETIC SEAL LEAK DETECTION APPARATUS

(75) Inventor: Anthony R. Kelley, Somerville, AL (US)

(73) Assignee: United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 283 days.

(21) Appl. No.: 12/870,468

(22) Filed: Aug. 27, 2010

(51) Int. Cl.
*G01M 3/34* (2006.01)
(52) U.S. Cl.
USPC .......................................................... 73/49.3
(58) Field of Classification Search
USPC ............................................... 73/49.36, 49.3
See application file for complete search history.

(56) References Cited

U.S. PATENT DOCUMENTS

| | | | |
|---|---|---|---|
| 5,821,147 A | 10/1998 | Kizilyalli | |
| 5,843,140 A | 12/1998 | Strojnik | |
| 6,439,033 B1 * | 8/2002 | Lehmann | 73/49.3 |
| 6,584,828 B2 * | 7/2003 | Sagi et al. | 73/40 |
| 6,829,936 B2 * | 12/2004 | Lehmann | 73/493 |
| 7,000,456 B2 * | 2/2006 | Lehmann | 73/49.3 |
| 7,062,012 B1 | 6/2006 | Chng et al. | |
| 7,290,439 B2 | 11/2007 | Perkins et al. | |
| 7,320,243 B2 | 1/2008 | Perkins et al. | |
| 7,571,636 B2 | 8/2009 | Mayer | |
| 7,578,170 B2 | 8/2009 | Mayer et al. | |
| 7,621,623 B2 | 11/2009 | Umeda | |
| 2003/0181794 A1 | 9/2003 | Rini et al. | |
| 2005/0079620 A1 | 4/2005 | Eberhard et al. | |
| 2006/0260713 A1 | 11/2006 | Pyszczek et al. | |
| 2009/0025457 A1 * | 1/2009 | Lehmann | 73/49.3 |
| 2010/0050747 A1 | 3/2010 | Hua et al. | |

* cited by examiner

*Primary Examiner* — John Fitzgerald
*Assistant Examiner* — David Z Huang
(74) *Attorney, Agent, or Firm* — Absolute Technology Law Group, LLC; James J. McGroary

(57) ABSTRACT

The present invention is a hermetic seal leak detection apparatus, which can be used to test for hermetic seal leaks in instruments and containers. A vacuum tight chamber is created around the unit being tested to minimize gas space outside of the hermetic seal. A vacuum inducing device is then used to increase the gas chamber volume inside the device, so that a slight vacuum is pulled on the unit being tested. The pressure in the unit being tested will stabilize. If the stabilized pressure reads close to a known good seal calibration, there is not a leak in the seal. If the stabilized pressure reads closer to a known bad seal calibration value, there is a leak in the seal. The speed of the plunger can be varied and by evaluating the resulting pressure change rates and final values, the leak rate/size can be accurately calculated.

16 Claims, 3 Drawing Sheets

HERMETIC SEAL LEAK DETECTION APPARATUS

FEDERAL RESEARCH STATEMENT

The invention described herein was made by an employee of the United States Government and may be manufactured and used by or for the Government of the United States of America for governmental purposes without the payment of any royalties thereon or therefore.

TECHNICAL DESCRIPTION OF THE INVENTION

This invention relates generally to the field of testing and measuring seals for leaks, and more specifically to an apparatus designed to test hermetic seals for leaks without the need for gas pressurization, vacuum systems, mass spectrometers, and risk of gas contamination.

BACKGROUND OF THE INVENTION

The hermetic seal on shuttle rocket booster (SRB) pressure sensors cannot be easily tested for leaks. Currently, if a leak is suspected in one of these hermetic seals, the seal can be tested only by traditional seal leak evaluation methods, which may require disassembling the transducer or some other form of destructive testing. With SRB pressure sensors in limited supply, disassembly or destructive testing is not favorable.

Other instruments, as well as consumer products (e.g., vitamins, milk, etc.), contain hermetic seals that may need to be tested for leaks. Presently, most seals are tested by introducing a foreign gas, such as helium. A hermetically sealed device is pressurized under vacuum conditions with helium for a period of time inside a vacuum tight chamber. If there is a leak in the seal, helium is forced into the sealed device. The vacuum chamber is then vented. The helium is then pulled out of the vacuum tight chamber, by vacuum pump, and a slight vacuum is pulled on the unit being tested. Any helium that was forced into the device as a result of a leaking seal will escape from the device in the lower pressure. A mass spectrometer is used to detect helium leaking from inside the hermetic seal under vacuum conditions.

This pressurized gas means of leak detection is problematic in many respects. First, it cannot be used to detect large leaks. When the pressurized helium (or other gas) is removed by vacuum pump, any helium escaping from a large seal leak will similarly be removed and no helium will show up on the mass spectrometer, resulting in a false reading that the seal is good. Second, the method requires the removal of gas permeable materials (e.g., soft components such as gaskets and grommets). Deconstruction of these devices, particularly SRB pressure sensors, to remove gas permeable materials is risky as gaskets and grommets can break or tear easily during removal. This method is also time-consuming, requiring multiple sessions of pressurizing, depressurizing, and observing. Further, there is the risk of contamination with whatever gas is chosen. Finally, mass spectrometers are very expensive, making this pressurized gas system of hermetic seal leak detection very expensive. Approximately $10,000 of hardware is needed for this method of testing.

Hermetic seals are alternatively tested by pressurizing the device being tested and then submerging it in a chemical bath. If there is a hole in the device, gas will enter the device when it is pressurized and escape into the lower pressure area when submerged. The escaping gas creates bubbles, which can be visually observed.

This pressure/submersion means of leak detection is also problematic in many of the same ways as the pressurized gas means of leak detection. First, all soft goods (e.g., gaskets and grommets) must be removed, leading to the same deconstruction problems observed with the pressurized gas means of leak detection. Second, if there is a leak in the device, there is the risk of contamination with the chemical when the device is submerged. This is particularly important for SRB pressure sensors, which cannot have moisture buildup or condensation on the interior of the sensor. This method is also time-consuming, requiring multiple steps and long periods of observation. Finally, this pressure/submersion means of leak detection requires not only vacuum chamber and pump devices, but also a chemical bath, making it just as costly as the pressurized gas means of leak detection.

It is desirable to have a simple, low-cost system for detecting hermetic seal leaks.

It is desirable to have a system for detecting hermetic seal leaks that eliminates the need for pressurizing gas.

It is desirable to have a system for detecting hermetic seal leaks that does not require disassembly or destruction of the unit/instrument before testing for a leak.

It is desirable to have a system for detecting hermetic seal leaks that is capable of detecting very small leaks, as well as large leaks.

It is desirable to have a system for detecting hermetic seal leaks that does not require the removal of gas permeable materials.

It is further desirable to have a system for detecting hermetic seal leaks which does not contaminate the unit being tested with helium or other detection gases or liquids.

SUMMARY OF THE INVENTION

A vacuum tight chamber is created around the unit being tested to minimize gas space outside of the hermetic seal. A vacuum inducing device (e.g., a plunger) is then used to increase the gas volume inside the device, so that a slight vacuum is pulled on the unit being tested. The pressure in the unit being tested will stabilize. If the stabilized pressure reads close to a known good seal calibration, there is not a leak in the seal. If the stabilized pressure reads closer to a known bad seal calibration value, there is a leak in the seal. The speed of the plunger can be varied and by evaluating the resulting pressure change rates and final values, the leak rate/size can be accurately calculated.

Various methods for creating a pressure differential between the vacuum tight chamber and the unit being tested can be used. For example, positive pressure can be used in place of a vacuum pulled on the unit being tested, and other pressure-changing devices (i.e., pump, diaphragm, bellows, etc.) can be used in place of a plunger. A change in temperature can also be used to change the pressure of the vacuum tight chamber without using a plunger or other device.

Because the seals are tested using pressure readings, no specific gas or mass spectrometer is needed. Large leaks are also easily identified, as a large leak will create a rapid depressurization, resulting in a rapidly stabilized pressure reading closer to the known bad seal calibration. Assuming room air is acceptable, there is no risk for contamination, and gas permeable materials do not need to be removed. The hermetic seal testing can be performed using any suitable gas compatible with the object under test.

It is important that the device is calibrated for known good and bad seals for the unit being tested in order to accurately interpret results. Calibration readings should be taken using the specific means by which the pressure differential in the vacuum tight chamber will be created. While seal leaks can be determined and measured with this device using the laws of thermodynamics including but not limited to the ideal gas laws, automating the system and performing calibrations while the device is in place in the system will provide greater control and quicker, more accurate calculations of leak size/rate.

GLOSSARY

Figure 1:
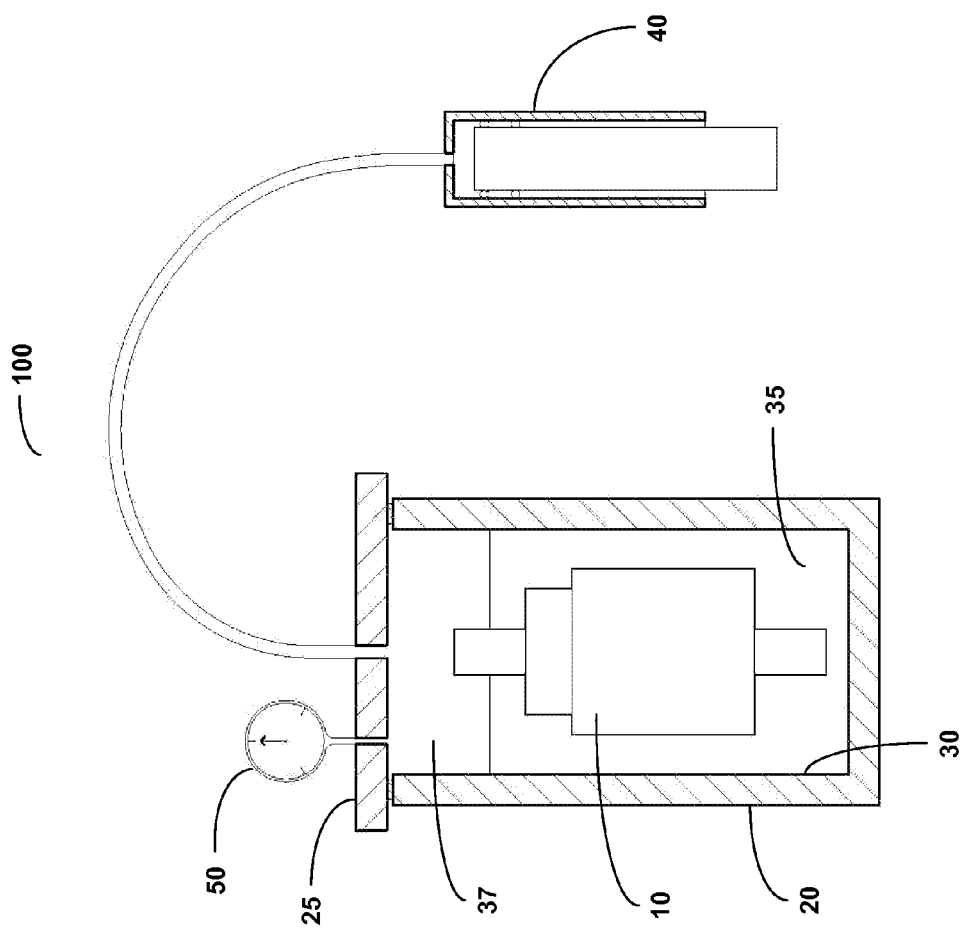
FIG. 1 illustrates a side view of an exemplary embodiment of a hermetic seal leak detection apparatus.

As used herein, the term "bellows" refers to an expandable vessel that can be compressed when pressure is applied to the outside of the vessel, or extended under vacuum, returning to its original shape when the pressure or vacuum is released.

As used herein, the term "hollow structure" refers to a closed or partially closed component which contains empty space or gas, such as air.

As used herein, the term "sealing plate" refers to component that closes or seals a hollow structure that is partially closed.

As used herein, the term "vacuum inducing device" refers to a component capable of changing the volume inside a sealed chamber resulting in an internal gas pressure change. Examples of a vacuum inducing device include but are not limited to diaphragms, bellows, plungers, pistons, positive displacement pumps, calibrated flow vacuum pumps, etc.

DETAILED DESCRIPTION

For the purpose of promoting an understanding of the present invention, references are made in the text to exemplary embodiments of a hermetic seal leak detection apparatus, only some of which are described herein. It should be understood that no limitations on the scope of the invention are intended by describing these exemplary embodiments. One of ordinary skill in the art will readily appreciate that alternate but functionally equivalent materials, components, and placement may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates an exemplary embodiment of hermetic seal leak detection apparatus 100 comprised of sealed pipe 20, plate 25, and vacuum inducing device 40. In the embodiment shown, sealed pipe 20 has three sides which enclose test chamber 30. The fourth side of test chamber 30 of sealed pipe 20 is enclosed by plate 25. Test chamber 30 of sealed pipe 20 is capable of handling a vacuum or positive pressure when plate 25 is in position. In the embodiment shown, vacuum inducing device 40 is a plunger; however, in various embodiments, vacuum inducing device 40 may be any device capable of changing the volume enclosed inside test chamber 30 resulting in an internal gas pressure change.

Hermetic seal device 10 is placed inside sealed pipe 20. The interior of sealed pipe 20 further includes a non-gas permeable material 35 that fills and minimizes the volume of gas space 37 which surrounds hermetic seal device 10. Non-gas permeable material 35 improves the accuracy and leak detection sensitivity of hermetic seal leak detection apparatus 100. To reduce the size of gas space 37, vacuum inducing device 40 is moved toward hermetic seal device 10. To increase the size of gas space 37, vacuum inducing device 40 is moved away from hermetic seal device 10 toward plate 25. When vacuum inducing device 40 is moved away from hermetic seal device 10, a slight vacuum is pulled on hermetic seal device 10. The resulting changes in pressure can be measured by any type of pressure or strain stressing instrument.

Pressure sensing instrument 50 is connected on one end to test chamber 30 causing it to react to a change in pressure in test chamber 30. When vacuum inducing device 40 is moved away from hermetic seal device 10, pressure sensing instrument 50 will react to the slight vacuum being pulled on test chamber 30 and on hermetic seal device 10. If hermetic seal device 10 does not have a leak, the pressure in test chamber 30 will stabilize at a larger absolute pressure value in test chamber 30. If there is a leak in hermetic seal device 10, gas will escape from hermetic seal device 10 into gas space 37 resulting in a lower absolute pressure value in test chamber 30. If hermetic seal device 10 has a large leak, the pressure inside test chamber 30 will stabilize quicker than if hermetic seal device 10 has a small leak. The speed at which the pressure inside test chamber 30 stabilizes can be measured and used to determine the size of the leak. The size of the leak may also be determined by varying the speed of vacuum inducing device 40 and monitoring the transient speed of the resulting pressure change over time.

Alternatively, hermetic seal device 10 can be tested for leaks by reducing gas space 37. If gas space 37 is reduced by moving vacuum inducing device 40 toward hermetic seal device 10, a slight positive pressure will occur in test chamber 30. Pressure sensing instrument 50 will react to the increase in pressure in test chamber 30 by indicating a positive pressure. If hermetic seal device 10 does not have a leak, the pressure in test chamber 30 will stabilize at a higher pressure value indicated in test chamber 30. If there is a leak in hermetic seal device 10, gas will be forced into hermetic seal device 10 and the pressure inside test chamber 30 will stabilize at a lower pressure value than in the case without a leak. The speed at which the pressure inside test chamber 30 stabilizes can be measured and used to determine the size of the leak. The size of the leak may also be determined by varying the speed of vacuum inducing device 40 and monitoring the transient speed of the resulting pressure change over time.

The smaller gas space 37, the more sensitive hermetic seal leak detection apparatus 100 will be to gas volume changes and resulting pressure changes in detecting and characterizing leaks. Test chamber 30 may be created specifically to fit around a particular hermetic seal device. This is especially desirable if the hermetic seal device requires frequent testing. Alternatively, material that is impermeable to gas 35 may be placed in test chamber 30 around the hermetic seal device 10 to decrease gas space 37, resulting in increased leak detection and leak characterization sensitivity. Alternatively, a smaller hermetic seal leak detection apparatus could be used.

In various embodiments, pressure sensing instrument 50 is known in the art and may be used to read changes in pressure inside test chamber 30. In other embodiments, strain gauges or gas density monitoring devices such as laser densitometers could be used for leak detection and characterization with comparable results. In various embodiments, a computerized data logging system may be used to monitor the response, i.e., change in pressure, over time. In other embodiments, a meter or an oscilloscope electronic data acquisition device may be used or the readings of a mechanical pressure sensing instrument may be manually recorded.

In various embodiments, sealed pipe 20 and/or plate 25 may further include optional electrical feedthroughs (i.e., sealed electrical connections) that allow functional testing at various pressure conditions.

Figure 2:
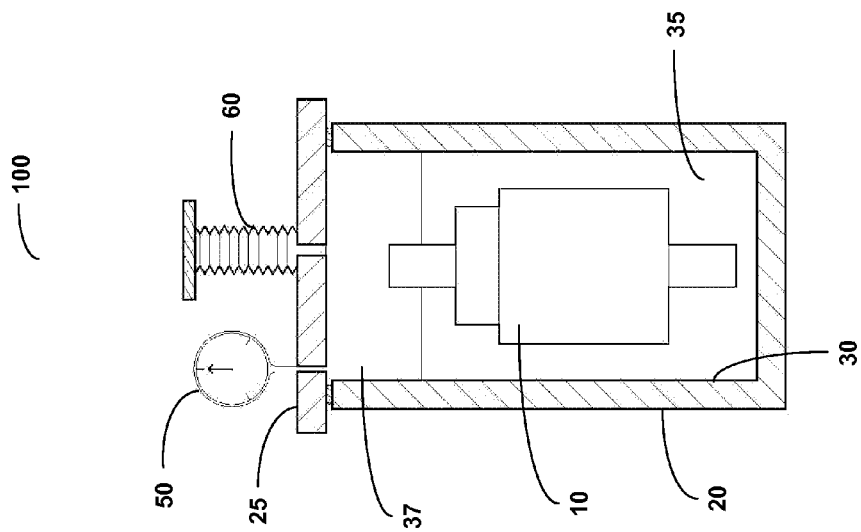
FIG. 2 illustrates a side view of a second exemplary embodiment of a hermetic seal leak detection apparatus.

FIG. 2 illustrates a side view of a second exemplary embodiment of hermetic seal leak detection apparatus 100. In the embodiment shown, bellows 60 is used to increase/decrease the volume of gas space 37 in test chamber 30, creating a negative/positive pressure in test chamber 30. Bellows 60 allows for more precise control in the adjustment of the volume of gas space 37.

Figure 3:
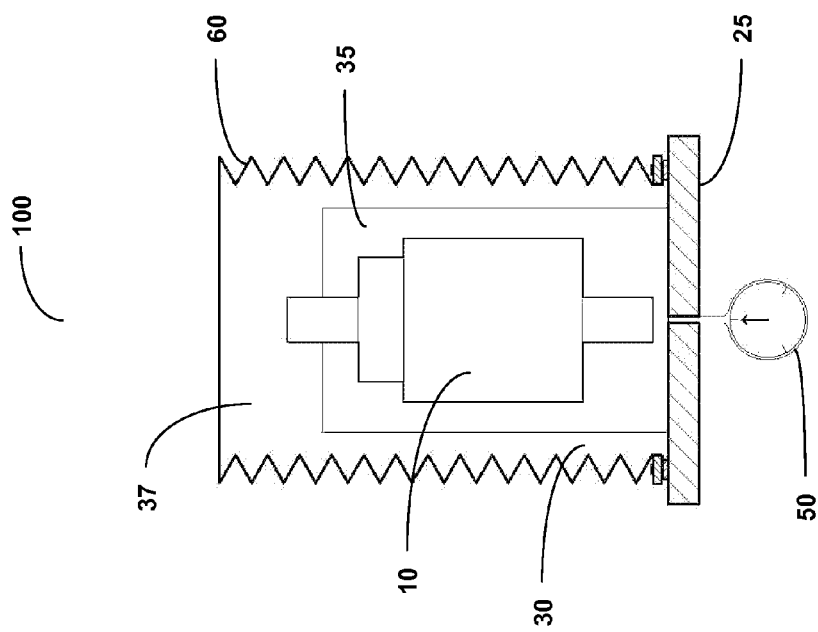
FIG. 3 illustrates a side view of a third exemplary embodiment of a hermetic seal leak detection apparatus.

FIG. 3 illustrates a side view of a third exemplary embodiment of hermetic seal leak detection apparatus 100. Visible in FIG. 3 is bellows 60, which is flexible and capable of being expanded and contracted. Expanding and contracting bellows 60 increases or decreases the amount of gas space 37 in test chamber 30 resulting in a corresponding pressure change. This is a simplified embodiment that omits the need for sealed pipe 20 (shown in FIGS. 1 and 2).

The expansion and contraction of bellows 60 creates a pressure change which is referred to as a positive or negative pressure in test chamber 30. A positive pressure is a pressure rating relative to atmospheric conditions with a psi measurement of greater than zero. A negative pressure has a psi measurement of less than zero gauge pressure, creating a vacuum. Bellows 60 allows for more precise control in the adjustment of the volume of gas space 37.

In the embodiment shown, the top end of bellows 60 is welded shut and the bottom end of bellows 60 is clamped to plate 25. In other embodiments, bellows 60 is sealed using another means known in the art.

In various other embodiments, the pressure inside test chamber 30 can also be changed by heating and/or cooling sealed pipe 20. Creating a change in pressure in test chamber 30 by changing the internal volume of gas space 37 or by changing the temperature inside test chamber 30 allows a hermetic seal device 10 to be tested for leaks without using a vacuum pump to remove molecules from test chamber 30. The change in pressure that results from a change in the volume or temperature in test chamber 30 can be accurately measured. In contrast, is it difficult to determine the exact amount of gas removed from an area using a vacuum pump.

In various other embodiments, hermetic seal leak detection apparatus 100 may be automated by attaching a lever to one end of bellows 60 or vacuum inducing device 40 with a mechanical stop so that the volume of test chamber 30 and gas space 37 are changed by the same amount every time. The pressure readings for a known good seal should be the same for a given volume change.

What is claimed is:

1. A hermetic seal leak detection apparatus comprised of:
a hollow structure with a sealed pipe volume having a fixed gas space, wherein said pipe volume encloses an internal test chamber adapted to enclose a hermetically sealed device and to surround said hermetically sealed device with a gas space;
a sealing plate; and
a movable variable speed vacuum inducing device capable of changing the volume of said gas space within said inner chamber and operatively coupled with sensors wherein said sensors repeatedly measure change rates in said gas space pressure and wherein said sensors automate the movement of said vacuum inducing device.

2. The apparatus of claim 1 wherein said sealing plate encloses said chamber.

3. The apparatus of claim 1 wherein said vacuum inducing device is a plunger.

4. The apparatus of claim 3 wherein said plunger is slidingly attached at one end to said chamber and changes the volume in said chamber.

5. The apparatus of claim 4 wherein said plunger is slidingly attached at one end to said chamber and changes the pressure in said chamber by changing the volume in said chamber.

6. The apparatus of claim 1 wherein said hollow structure is a tubular structure.

7. The apparatus of claim 1 wherein said hollow structure is a pipe.

8. The apparatus of claim 1 wherein said sealing plate is movable.

9. The apparatus of claim 1 wherein said hollow structure has a shape selected from the group consisting of rectangular, cubic, cylindrical, spherical and irregular shaped.

10. The apparatus of claim 1 which further includes a pressure sensor.

11. The apparatus of claim 10 wherein said pressure sensor further includes a component for sensing changes in pressure over a period of time.

12. The apparatus of claim 10 wherein said pressure sensor further includes a sealed electrical connection through the walls of said sealing plate to allow electronic functional testing at various pressure conditions.

13. The apparatus of claim 1 which further includes a computerized data logging system to monitor response over time.

14. A method for detecting a hermetic seal leak comprising the steps of:
placing a hermetically sealed device in a chamber of a hollow structure;
sealing said chamber with a sealing plate such that a fixed gas space is created within said chamber;
moving a vacuum inducing device to create a change in pressure;
determining if said hermetically sealed device has a leak by recording output from a pressure sensor connected at one end to said chamber;
measuring the time it takes for the pressure inside said chamber to stabilize;
measuring the pressure change in the chamber as it stabilizes;
determining the presence of a leak based on the rate of pressure change, the final pressure and volume of the chamber; and
determining the size of any said leak based on the rate of pressure change or how long it takes the pressure inside said chamber to stabilize.

15. The method of claim 14 which further includes the step of placing material that is impermeable to gas inside said chamber to decrease gas space.

16. The method of claim 14 which further includes the step of performing electronic functional testing at various pressure conditions.

\* \* \* \* \*